United States Patent Office 2,935,437
Patented May 3, 1960

2,935,437
METHOD OF MAKING A PIGMENT-FILLED PAPER

Louis B. Taylor, Pittsburgh, Pa., assignor to Columbia-Southern Chemical Corporation, Allegheny County, Pa., a corporation of Delaware No Drawing. Application November 20, 1953
Serial No. 393,522

7 Claims. (Cl. 162—181)

This invention relates to a pigment-filled paper and method of producing the same.

Filling of paper with a pigment to improve brightness and opacity has been previously suggested. In the practice of the process, pigment is added to a slurry of wood pulp and the resulting slurry fed to the wire of a papermaking machine, on which a paper sheet is formed. A difficulty encountered with this procedure is that frequently a large percentage of the pigment is lost through the wire.

According to this invention it has been found that paper of high brightness, opacity, and smoothness may be prepared by adding a finely divided hydrated amorphous calcium silicate or other alkaline earth metal silicate to a slurry of wood pulp which is maintained at a pH in the range of 4 to 9.2 throughout the addition by means of an acidic substance which forms a water insoluble salt of the alkaline earth metal silicate. A precipitate is formed in situ on the surfaces of the cellulosic fibers by the reaction of the acid-reacting substance with calcium silicate. The precipitate adheres firmly to the fibers, so that pigment losses through the wire of a paper making machine are quite small compared to the losses of most pigments. Paper useful for printing and writing is prepared.

An amorphous hydrated calcium silicate having an average ultimate particle size less than 0.1 micron, a bound water content of about 3 to about 15 percent by weight, and a free water content of about 4 or 5 percent by weight has been found to be particularly suitable for use in the present invention. "Free water" is water which is driven off in drying at about 105° to 110° C. for 24 hours. Bound water is water which is water other than free water which is expelled on ignition at about 1000° C. Best results are obtained when the mole ratio of $SiO_2$ to CaO in the calcium silicate is preferably in the range 2:1 to 4:1. However, other silicates in which this ratio is as low as 1:1 may be used.

One method of producing finely divided amorphous hydrated calcium silicate is to mix flowing streams of calcium chloride and sodium silicate solutions together in a zone of high turbulence, where almost instantaneous mixing can be effected. Calcium chloride should be present in excess. While considerable variation in the concentrations of the reactant solutions is possible without affecting the particle size of the calcium silicate produced, a calcium chloride solution containing 50 to 150 grams of salt per liter and a sodium silicate solution containing 5 to 15 percent by weight of sodium silicate with a $Na_2O:SiO_2$ ratio varying from 1:2 to 1:4 are preferred. One way to produce the required turbulence is to introduce the two streams closely together into the central area of a centrifugal pump. Agitation of the mixture is effected as the reactant streams are thrown outwardly by the pump rotor. To effect maximum agitation, the amount of reacting solution supplied to the pump is held below the capacity of the pump to deliver liquid, usually less than 90 percent of the pump capacity, and preferably 65 percent or less. Running the pump in this way causes the reacting mass to remain in the zone of agitation for a longer period and insures the production of calcium silicate having the desired fineness. Calcium silicate which precipitates is separated from the slurry in which it is formed, and is dried at a temperature ranging from about 100° C. to 150° C., generally at about 125° C.

Calcium silicate prepared by the above-described method has an average ultimate particle size of about 0.015 to 0.04 micron and a surface area of about 50 to 100 square meters per gram. An aqueous suspension containing 5 percent by weight of calcium silicate prepared according to the above procedure and having the composition $CaO(SiO_2)_{3.3}$ and an average ultimate particle size of 0.03 micron has been found to have a pH of 10.0.

Any type of paper pulp may be used in making paper according to the present invention. Thus the paper stock may consist of a chemically treated pulp (sulfite, soda, or kraft), semi-chemical pulp or mechanically ground pulp, or any mixture of these. In addition to the virgin pulp, broke, i.e. cuttings or scraps of paper obtained from papermaking operations, may be included in the furnish. The pulp is slurried in water and beaten or jordaned to desired freeness. Broke may be added either dry or as an aqueous slurry to the virgin pulp slurry either before or after it is beaten. An acidic material as aforementioned may be added to the pulp slurry either before or after beating. In some cases the water in which the pulp is slurried contains sufficient quantity of acidic material to maintain the pH of the slurry below 9.2 throughout the addition of calcium silicate so that no further addition of acid is necessary. This is particularly true when the water contains appreciable quantities of sodium bicarbonate, or equivalent acidic material.

The pH of a pulp slurry containing mechanically ground wood should not be allowed to rise above about 9.2 at any time, because higher alkalinities result in darkening of groundwood fibers. A pH of at least 4 should be maintained at all times, since some degradation of the cellulose structure occurs in more acid solutions.

Acidic materials which react with calcium silicate to form an insoluble calcium salt are especially desirable. The term "acidic material" as herein used includes not only acids but also acid salts, i.e., those having a hydrogen atom replaceable by a metal, whether they are acidic or mildly alkaline in aqueous solution, and normal salts having an acidic reaction. Typical of the acids usable are sulfuric, sulfurous, phosphoric, phosphorus, tartaric, citric, and oxalic acids. Acid salts which react to form insoluble calcium salts include sodium bisulfate, sodium bisulfite, monosodium phosphate, and sodium bicarbonate. A salt such as sodium bicarbonate is less alkaline than calcium silicate, and reacts therewith, reducing the pH of aqueous suspensions of calcium silicate below that which would result with calcium silicate alone. Normal salts which hydrolyze in water to form acidic solutions and react with calcium silicate include aluminum sulfate, ammonium sulphate and aluminum phosphate. In general, a non-oxidizing acid or acid-reacting salt whose corresponding calcium salt is insoluble may be used as the acidic material in the present invention. All of the aforementioned substances react with calcium silicate to form a complex precipitate containing silica and more or less of the calcium salt of the acidic material. Whether or not there is any chemical combination between silica and the calcium salt is undetermined.

The quantity of calcium silicate added to the slurry is enough to provide about 0.5 to about 20 percent of $SiO_2$ based on the weight of fiber in the pulp. Usually the amount is greater than the stoichiometric quantity for complete neutralization of the acidic material present. When the stoichiometric quantity of silicate is used, all of the CaO therein is neutralized by the acidic material, forming silica and the calcium salt of the acidic material. As has been indicated, the acidic material should be one which forms an insoluble calcium salt, so that the precipitate which forms is either a composite of silica and an insoluble calcium salt or some chemical combination of the two.

The acidic material is conveniently added to the pulp slurry prior to the addition of calcium silicate. This is not essential, however; the acidic material may be added concurrently with the calcium silicate if desired. Any order of addition of silicate and acid may be followed so long as the pH of the pulp slurry is kept within the proper range at all times.

The reactions of calcium silicate with acidic materials are typified by the reaction with aluminum sulfate, in which one mole of aluminum sulfate is reacted with at least three moles of calcium silicate $CaO(SiO_2)_x$ where $x$ is not less than 2 nor greater than 4 to form a precipitate whose composition may be represented by the formula:

$$bCaO.Al_2O_3.axSiO_2.cSO_3$$

where $a$ is at least 3, $b$ is equal to or less than 2, and $c$ is equal to or less than $a$ and generally less than $b$. Small amounts of CaO and $SO_3$ are dissolved, so that $b$ and $c$ are invariably less than $a$. The maximum value of $a$ is such that the pH of the slurry does not exceed 9.2.

Pigment loadings of less than one percent up to 30 percent by weight or even higher have been found to be quite effective for producing paper of high brightness, opacity, and smoothness. Bursting and tear strength are satisfactory in paper sheets prepared according to the present invention, and in some cases tear strength even exceeds that of an unpigmented sheet.

The chemical pulps and mechanically ground fibers of low resinous content, i.e., northern pine, spruce, hemlock, are amenable to treatment in acid medium. In a typical procedure for precipitating the pigment of this invention in situ in such fibers, a substance possessing appreciable acidity, as for example, sulfuric acid or aluminum sulfate, is added to a beaten pulp slurry in sufficient quantity to establish a pH in the range of about 4 to 5.5. Thereafter calcium silicate is added, reacting with the acid to form a precipitate in situ on the surfaces of the fibers. The amount of calcium silicate is sufficient to react with all of the acid present but is generally less than twice that amount. As calcium silicate is added, the pH of the slurry rises. The amount of calcium silicate added is such that the final pH does not exceed 9.2. Paper produced by this method is suitable for printing, for example, as top liner for box-board cartons. Slight modification of this method to include a precipitated size may be made when writing paper is desired.

In the production of writing papers, it is necessary to size the sheet. A convenient way to produce a sized sheet for writing is to add rosin size (sodium resinate) to the pulp prior to the addition of acid, either before or after the pulp is beaten. A size precipitant, preferably aluminum sulfate, is added either prior to or concurrently with the addition of acid. Other size precipitants, as for example titanic sulfate, may be used in place of aluminum sulfate. The size is precipitated as a resinate of the heavy metal (usually aluminum). To acidify the pulp slurry, a further quantity of aluminum sulfate, or other acidic material, is added, after which calcium silicate is added.

Pulp may be bleached in acid medium, particularly with sulfurous acid or zinc hydrosulfite, prior to pigmentation according to the present invention. In such a process the residual acid in the bleached pulp is not washed out but is allowed to remain. This acid reacts with calcium silicate which is subsequently added, forming a precipitate which includes calcium sulfite, an exceptionally white substance, on the fiber surfaces.

Paper can be prepared by addition of calcium silicate to a mildly alkaline pulp slurry in which alkalinity is imparted by an alkaline-reacting acid salt such as sodium bicarbonate or disodium phosphate. These salts behave as buffers, so that substantial volumes of calcium silicate can be added to the pulp slurry without raising the pH to an undesirably high level. While any pulp, either chemical or mechanically ground, can be loaded with calcium silicate in an alkaline medium, this method is particularly adaptable to the pigmentation of mechanically ground fibers of highly resinous woods such as southern pine.

In a typical operation in alkaline medium according to the present invention, an aqueous slurry of kraft process and mechanically ground southern pine fibers is jordaned or beaten, and an acid salt (that is, one having a hydrogen atom replaceable by a metal) which is mildly alkaline is added to the slurry. This addition is omitted in the event an appreciable quantity of such compound is present in the water in which the pulp is slurried. Calcium silicate is then added. Loadings of about 3 to 30 percent by weight of calcium silicate based on the weight of dry pulp have been found to be good for production of a paper sheet having a smooth surface in addition to high brightness and opacity. In no event is the amount of calcium silicate so great as to cause the pH of the slurry to rise above 9.2. Paper made according to this embodiment of the present invention is particularly adapted for printing. Thus a printing sheet which compares favorably with printing sheets made from northern woods, which are gradually being depleted, can be made from the cheaper and much more readily available southern pine. Unpigmented southern pine has a comparatively rough surface and does not receive ink uniformly due to the presence of hard summer growth fibers having low ink receptivity.

The percentage of kraft fibers in southern pine paper stocks is sufficient to give acceptable strength on the wire of the paper-making machine, and is most frequently in the range of about 45 to 70 percent of the total weight of virgin pulp, with mechanically ground pulp constituting the remainder. Broke may be present in addition to virgin pulp. Mechanically ground southern pine contains a high percentage of resin, which is prone to coagulate in acid medium. For this reason the pH of aqueous pulp slurries containing mechanically ground southern pine and other woods of high resinous content is preferably maintained in the range 7 to 9.2.

Following the precipitation of neutralized or partially neutralized calcium silicate on the cellulosic fiber surfaces according to the present invention, the slurry of pigmented pulp which preferably has a consistency of about one percent or other desired consistency is sheeted into paper on the wire of a papermaking machine in a conventional manner. Conventional papermaking machinery such as a Fourdrinier machine may be used in the formation of a paper web. The web is couched from the wire and subsequently treated according to conventional procedure, i.e., it is dried, calendered, and may be coated. Typical of the coatings which may be applied is a clay coating which is bonded to the sheet by an adhesive such as starch. Such coating improves the brightness and opacity of the sheet somewhat, and markedly improves the smoothness and gloss. High smoothness and gloss are particularly important in papers on which photographs are to be printed.

Ground wood fibers may be bleached as well as pigmented according to the present invention. In one procedure for accomplishing this an aqueous slurry of ground wood or mixed ground wood and chemical fibers is bleached by the addition of chlorine in an oxidizing form, either as chlorine gas, sodium hypochlorite or calcium hypochlorite which is maintained in the pH range of approximately 9.5 to 11 by calcium silicate. After bleaching the pH of the slurry is reduced to less than 9.2 by the addition of an acidic substance whose corresponding calcium salt is insoluble.

In the preparation of paper according to this invention difficulty is encountered due to loss of fiber through the screen of the paper forming machine. This fiber is usually in the form of small fibrils which are not readily entrapped by the paper. An embodiment of the present invention provides a convenient means for recovering this fiber.

According to this invention the water passing through the screen is collected and the fibers treated with calcium silicate. This treatment may be effected by adding pulp and calcium silicate to the collected water and forming paper from the resulting slurry. A very small amount of calcium silicate, for example less than one percent and frequently one-half percent or less based on the weight of fibers, suffices, although it is understood that amounts many times larger also result in improved fiber retention. Alternatively, the fiber may be recovered by flotation, filtration or the like and mixed with further pulp and with calcium silicate. The resulting slurry is used for paper formation. In either case the calcium silicate attaches to the fibers and reduces loss thereof through the paper forming screen.

In order to minimize loss of calcium from the system by virtue of dissolution of calcium sulphate (formed by reaction of aluminum sulphate, sulphuric acid or the like with calcium silicate) it is preferred to use water containing substantial calcium for proper formation. Water containing upward of 20 parts per million by weight of calcium is suitable.

According to a further embodiment of the invention it has been found that special precautions are required in order to minimize the loss of calcium silicate through the paper forming screen. Thus it has been found that pigment retention is at a maximum when the pulp-calcium silicate slurry is allowed to stand about one to four hours before the paper sheet is formed. Pigment retention is good, however, provided the calcium silicate has been suspended in water for at least about one-half hour prior to paper formation. The pigment may be added dry to a pulp slurry, which is allowed to stand at least one-half hour before it is sheeted into paper. Alternatively the pigment may be slurried in water and then admixed with the pulp slurry, the time from suspension of the pigment in water until formation of the paper sheet being at least one-half hour. On the other hand, it is undesirable to allow paper pulp and calcium silicate to stand together in aqueous suspension for an excessive length of time. The pigment retention is good if the time elapsing from admixture of the pigment and pulp until formation of the paper sheet is less than about 24 hours, although retention begins to fall off after the pigment-pulp slurry has stood for more than about four hours.

Good results may be obtained by slurrying dry calcium silicate with water for at least 30 minutes before adding it to the pulp slurry and then forming paper from pulp slurry immediately or shortly after addition of the calcium silicate thereto. Alternatively, calcium silicate may be precipitated by reaction of calcium chloride and sodium silicate and allowed to stand in aqueous suspension for at least 30 minutes before paper is formed.

The following examples are illustrative of the present invention:

EXAMPLE I

A pulp beater was charged as follows:

| | Grams |
|---|---|
| Unbleached sulfite pulp | 90 |
| Bleached kraft pulp | 180 |
| Hard white envelope cuttings | 90 |

This charge was dispersed in 23 liters of water and the resulting slurry was beaten in a Niagara beater for about 80 minutes to approximately 400 milliliters freeness, Canadian standard (TAPPI standard T227M50). One hundred milliliters of prepared rosin of about 5 percent by weight size was then added. Thereafter, 9 grams of pregelatinized starch was added and the pulp was circulated in the beater long enough to insure complete mixing. Aluminum sulfate in the amount of three percent by weight, based on the dry weight of pulp, was added as a solution containing 12.92 grams of aluminum sulphate octodecahydrate per liter. At this stage, the pulp consistency was approximately 1.1 percent. Stirring was continued for 2 minutes. Immediately thereafter, the amounts of calcium silicate having the composition $CaO(SiO_2)_{3.3}$ and titanium dioxide indicated in the table were added. The amounts are expressed as percentages of the dry weight of the pulp. Stirring of the mixture was continued for 10 minutes more, and the resulting stock was diluted to 8,000 milliliters, divided into ten 800-milliliter portions, and sheeted into paper. The paper was tested for brightness, opacity, bursting strength, weight and thickness, and ash and moisture content, with the following results:

Table I

| | Sample No. | | | | | |
|---|---|---|---|---|---|---|
| | 1 | 2 | 3 | 4 | 5 | 6 |
| Percent titanium dioxide by weight | 1.0 | 0.5 | none | 1.5 | none | none |
| Percent calcium silicate by weight | 1.0 | 2.5 | 4.0 | none | 4.0 | none |
| Brightness: | | | | | | |
| Green light | 70.8 | 70.0 | 72.9 | 73.2 | 72.2 | 70.5 |
| Blue light | 61.2 | 62.2 | 63.3 | 63.4 | 63.1 | 59.3 |
| Contrast ratio (green light): | | | | | | |
| Reflectance, black backing | 56.9 | 57.0 | 57.0 | 57.9 | 57.3 | 53.0 |
| Reflectance, white backing | 79.0 | 80.1 | 81.1 | 80.6 | 79.7 | 79.6 |
| Ratio | 72.1 | 71.2 | 70.3 | 71.8 | 71.9 | 66.6 |
| Contrast ratio (blue light): | | | | | | |
| Reflectance, black backing | 53.7 | 53.9 | 54.5 | 54.9 | 54.7 | 49.9 |
| Reflectance, white backing | 66.8 | 67.9 | 69.3 | 68.6 | 68.3 | 66.9 |
| Ratio | 76.2 | 75.3 | 74.5 | 75.9 | 76.0 | 70.6 |
| Bursting strength, lb./in.² | 32.0 | 34.5 | 33.0 | 33.6 | 35.0 | 35.0 |
| Percent ash in oven dry paper | 2.23 | 2.63 | 2.83 | 1.86 | 2.84 | 1.28 |

Comparison of paper pigmented with the calcium silicate-aluminum sulfate product of this invention (samples 3 and 5) with paper pigmented with titanium dioxide (sample 4) shows that about the same brightness and opacity is imparted by both pigments, and that both papers have about the same bursting strength. Hence, the relatively expensive titanium dioxide may be replaced with a reaction product of this invention at considerable saving in cost and without diminution of physical properties such as strength, brightness, or opacity. Titanium dioxide may be used in the present process as in samples 1 and 2.

EXAMPLE II

One thousand pounds of bleached kraft pulp and 1000 pounds of bleached sulfite pulp were slurried in roughly 6000 gallons of water. The pulp was agitated after which it was beaten in a stainless steel Jones beater at 3000 lb./sq. in. pressure for 90 minutes. Twenty-four pounds of rosin size in aqueous solution was added to the beater at the start of the beating cycle, and 26 fluid ounces of ultramarine blue, equivalent to 13 ounces of dry coloring matter, was added to the beater one-half hour after the start of the beating cycle. Fifty-one gallons of iron-free aluminum sulfate solution containing 3.5 pounds of $Al_2(SO_4)_3 \cdot 18H_2O$ per gallon was added to the beater one-half hour before the end of the beating cycle. While beating was in progress, 120 pounds of finely divided calcium silicate prepared by the reaction of sodium silicate with excess calcium chloride as described above was slurried with 500 pounds of broke and about 1000 gallons of water and agitated for one hour. This slurry and the beaten pulp were mixed in a stock chest. The stock thus formed, which had a solids content of about 4 to 5 percent, was pumped through a refiner and head box to a Fourdrinier machine. Free water containing small amounts of pigment and pulp was sucked through the wire and discarded, leaving a paper sheet which was dried and tub-sized.

For comparison of paper pigmented according to the present invention with paper pigmented with titanium dioxide, a sample of the latter was made as follows:

One thousand pounds of bleached kraft pulp and 1000 pounds of bleached sulfite pulp were slurried in roughly 6000 gallons of water. The pulp was agitated after which it was beaten in a stainless steel Jones beater at 3000 pounds per square inch roll pressure for 90 minutes. Twenty-four pounds of rosin size in aqueous solution was added to the beater at the start of the beating cycle. After beating had continued for one-half hour, 50 pounds each of titanium dioxide and Huber X-43 clay were added. Twenty-four gallons of iron-free aluminum sulfate solution containing 3.5 pounds of $Al_2(SO_4)_3 \cdot 18H_2O$ per gallon was added to the beater one-half hour before the end of the beating cycle. While beating was in progress, 500 pounds of broke was slurried in about 1000 gallons of water and agitated for one hour. This slurry and the beaten pulp were mixed in a stock chest, and the resulting stock was pumped through a refiner and head box to a Fourdrinier machine, where the pulp was sheeted into paper as described above.

The two samples of paper were analyzed for ash composition, brightness, opacity (contrast ratio), pH, yellowing with age, bursting strength and tear strength, with the following results:

Table II

|  | Calcium Silicate Pigmented | | Titanium Dioxide Pigmented | |
|---|---|---|---|---|
|  | Before Tub Size | After Tub Size | Before Tub Size | After Tub Size |
| Weight, lb. per ream (500 sheets, 22″ x 34″) | 19.4 | 20.6 | 19.7 | 20.0 |
| Thickness, mils per sheet | 3.8 | 4.1 | 3.8 | 3.9 |
| Percent ash in oven dry paper | 4.42 | 4.41 | 4.55 | 4.21 |
| Analysis of ash: | | | | |
| Percent $SiO_2$ | 55.6 | 56.3 | 20.1 | 19.7 |
| Percent $R_2O_3$ (including $TiO_2$) | 36.4 | 36.2 | 74.1 | 74.5 |
| Brightness (percent reflectance): | | | | |
| Blue light, felt side | 82.7 | 82.6 | 84.5 | 83.1 |
| Blue light, wire side | 82.3 | 82.9 | 84.6 | 83.3 |
| Green light, felt side | 83.1 | 83.2 | 83.9 | 83.4 |
| Green light, wire side | 82.6 | 84.0 | 84.2 | 83.6 |
| Contrast ratio: | | | | |
| Blue light | 85.8 | 84.2 | 88.3 | 85.3 |
| Green light | 82.0 | 80.0 | 84.2 | 80.9 |
| White light | 80.6 | 79.5 | 83.6 | 80.5 |
| pH (TAPPI Standard T435-M42) | 6.5 | 6.6 | 6.7 | 6.7 |
| Fadeometer Test: | | | | |
| Brightness before test | 82.7 | 82.5 | 84.5 | 83.0 |
| Brightness after 24 hours' exposure at 100° F | 78.3 | 77.4 | 79.4 | 78.6 |
| Change | 4.4 | 5.1 | 5.1 | 4.4 |
| Bursting Strength (Mullen) | 22.7 | 32.7 | 23.5 | 32.1 |
| Tear Strength (Elmendorf): | | | | |
| Machine direction | 55 | 50 | 48 | 43 |
| Cross direction | 57 | 51 | 52 | 49 |

The above table shows that a paper having high brightness and opacity and satisfactory strength can be prepared by the present invention and that the paper thus prepared is essentially equivalent in brightness and opacity to paper pigmented with titanium dioxide.

EXAMPLE III

A beater was charged with 600 pounds of rag fiber, 600 pounds of bleached kraft pulp, 1000 pounds of bleached sulfite pulp, 100 pounds of titanium dioxide, 32 pounds of rosin size in aqueous solution, and about 6000 gallons of water. The charge was beaten for about an hour and a half, and 16 fluid ounces of blue dye solution, 6 ounces of red dye solution, and 45 gallons of iron-free aluminum sulfate solution containing 3.5 pounds of $Al_2(SO_4)_3 \cdot 18H_2O$ per gallon were dumped into the beater 15 minutes before the end of the beating cycle. While beating continued, 200 pounds of finely-divided calcium silicate prepared by the reaction of sodium silicate with excess calcium chloride was placed in a hydrapulper together with 1200 pounds of broke consisting of scrap paper pigmented with titanium dioxide and about 2000 gallons of water. The hydrapulper was then started, and agitation continued for one hour. The hydrapulped slurry was mixed with two beaterloads of pulp in a stock chest. The stock was then pumped through a refiner and head bax to a Fourdrinier machine, where paper sheet was formed. The paper sheet was dried and tub sized.

For comparison, a paper sheet containing no calcium silicate was made. The procedure described in the previous paragraph was followed, except that 150 pounds of titanium dioxide and only 24 gallons of aluminum sulfate were used. All the pigment was admixed with the pulp and rag fiber in the beater. Results of tub-sized samples of the two papers are as follows:

Table III

|  | Calcium Silicate Pigmented | Titanium Dioxide Pigment only |
|---|---|---|
| Weight, lb. per ream (500 sheets, 22″ x 34″) | 19.7 | 20.6 |
| Thickness, mils per sheet | 4.1 | 4.2 |
| Brightness (percent reflectance, blue light): | | |
| Felt side | 85.0 | 83.3 |
| Wire side | 84.3 | 84.5 |
| Contrast ratio (green light) | 86.1 | 85.7 |
| pH (TAPPI Standard T435-M42) | 6.5 | 6.6 |
| Bursting Strength | 30.2 | 32.0 |
| Tear Strength: | | |
| Machine direction | 50 | 50 |
| Cross direction | 55 | 52 |

Comparison of the properties of paper containing calcium silicate with paper pigmented only with titanium dioxide shows no material difference between the two. About 4 to 5 pounds of calcium silicate per 100 pounds of dry pulp, together with sufficient acidic material such as aluminum sulfate to neutralize at least one-half of the lime content of the silicate, produces paper with similar optical properties to that produced by pigmentation with about 1½ to 3 percent of titanium dioxide based on the dry weight of pulp.

EXAMPLE IV

Three hundred and eighty-five grams of kraft pulp was slurried in 23 liters of water, soaked two hours, and beaten for three hours in a Niagara beater at 6500 grams bar load. Fourteen hundred grams of pulp slurry was diluted to 5900 grams, and 16.8 cc. of five percent aluminum sulfate solution, which corresponds to four percent by weight of aluminum sulfate based on the dry weight of pulp, was added. The pulp slurry was stirred five minutes. A slurry containing 1.05 grams of dried precipitated calcium silicate, $CaO(SiO_2)_{3.3}$, or about five percent by weight based on the dry weight of pulp, in 400 milliliters of water was prepared. This slurry was added to the pulp slurry and the mixture was stirred for five minutes.

This procedure was repeated in successive runs in which part of the aluminum sulfate was replaced by a one percent sulfuric acid solution. The amount of each reagent in each run was as follows:

|  | cc. of 5% $Al_2(SO_4)_3 \cdot 18H_2O$ | cc. of 1% $H_2SO_4$ |
|---|---|---|
| Run 1 | 16.8 | None |
| Run 2 | 12.6 | 7 |
| Run 3 | 8.4 | 14 |
| Run 4 | 4.2 | 21 |

Thus, one-third of one percent of sulfuric acid based on the dry weight of pulp was substituted for each one percent of aluminum sulfate replaced.

Samples from each run were tested for brightness, contrast, and bursting strength with the following results:

Table IV

|  | Run 1 | Run 2 | Run 3 | Run 4 |
|---|---|---|---|---|
| Brightness (percent blue reflectance) | 73.9 | 75.7 | 75.3 | 75.6 |
| Contrast ratio (green light) | 66.9 | 67.2 | 67.3 | 66.9 |
| Bursting strength | 27.2 | 27.2 | 26.8 | 26.4 |

Replacement of part of the aluminum sulfate with sulfuric acid results in a paper of improved brightness, about the same opacity, and slightly decreased bursting strength compared to paper produced using aluminum sulfate. Since sulfuric acid is much cheaper than aluminum sulfate, these results show the further advantage which accrues by use of sulfuric acid as the acidic substance and using aluminum sulfate only in sufficient quantities to precipitate the size. Other sulphur-oxygen containing acids, notably sulphurous acid including its anhydride $SO_2$, may be used with the same results.

EXAMPLE V

A slurry containing about 11,000 gallons of water and 5 tons of dry pulverulent amorphous hydrated calcium silicate having the composition $CaO(SiO_2)_{3.3}$ plus about 12 percent by weight of bound water and about 4 percent by weight of free water, and having an average ultimate particle size of about 0.03 micron, was prepared. To this slurry was added 2000 gallons of a solution containing 140 pounds of a mannogalactan gum. This slurry was allowed to stand for about 18 hours. Thereafter the slurry was pumped to a mixing chest at rates which were periodically increased. During the first 30 minutes of the test, the flow rate was 600 pounds of calcium silicate per hour. It was then increased to 1200 pounds per hour. This rate was maintained for one hour, at the end of which the rate was raised to 1800 pounds per hour, and then to 2400 pounds per hour after an additional hour. Calcium silicate was fed at the latter rate for 2 hours, at which time the test was ended. The calcium silicate slurry was mixed in the mixing chest with an aqueous slurry of pulp consisting of 65 percent by weight bleached kraft southern pine and 35 percent unbleached groundwood southern pine on a virgin pulp basis, plus 15 percent by weight of broke based on the weight of virgin pulp.

The water used to form these slurries had a pH of 7.7 and a calcium hardness of 39.3, and contained the following impurities in the amounts indicated:

|  | Parts per million by weight |
|---|---|
| Sodium bicarbonate | 295 |
| Sodium chloride | 124 |
| Sodium sulfate | 12 |
| Calcium bicarbonate | 38 |
| Calcium sulfate | 10 |
| Magnesium bicarbonate | 5 |
| Magnesium sulfate | 2 |
| Magnesium chloride | 3 |
| Volatile and organic matter | 21.2 |

The pulp slurry flowed at the rate of 5 tons of virgin pulp per hour, and had a consistency (percentage of virgin pulp by weight) of 3 percent by weight on leaving the mixing chest. The slurry of pulp and calcium silicate was pumped to a machine chest from which it was fed onto the wire of a Fourdrinier machine, which was moving at the rate of 1100 feet per minute. Thus on the average, the slurry was fed to the Fourdrinier machine within about 20 to 30 minutes after addition of calcium silicate to the cellulosic fiber. The paper web was pressed, dried, and calendered. A coating of clay was applied to the dried paper web.

An uncoated sheet filled with calcium silicate according to Example IV was ignited and found to contain 10.9 percent calcium silicate by weight.

Physical measurements on both clay-coated and uncoated sheets prepared according to Example IV were made. For the sake of comparison measurements were also made on control sheets which contained no filler but were otherwise prepared in the same manner as the test sheets. The following results were obtained:

Table V

|  | Filled Sheets | | Control Sheets | |
|---|---|---|---|---|
|  | Uncoated | Coated | Uncoated | Coated |
| Brightness (G.E.): |  |  |  |  |
| Felt side | 64.7 | 69.3 | 60.6 | 67.3 |
| Wire side | 64.5 | 68.4 | 61.4 | 67.5 |
| Opacity (Bausch & Lomb) | 80.8 | 91.6 | 75.8 | 89.8 |
| Smoothness (Sheffield): |  |  |  |  |
| Felt side |  | 227 |  | 172 |
| Wire side |  | 224 |  | 165 |
| Gloss: |  |  |  |  |
| Felt side |  | 42.4 |  | 37.0 |
| Wire side |  | 40.6 |  | 36.5 |
| Tensile strength: |  |  |  |  |
| Machine direction | 4.8 | 7.22 | 6.0 | 7.61 |
| Cross direction | 3.4 | 4.11 | 4.2 | 5.55 |
| Bursting strength (Mullen) | 10.7 | 13.61 | 12.7 | 15.65 |
| Tear strength of oven dried sheet (about 1% moisture by weight): |  |  |  |  |
| Machine direction | 21.7 | 20.3 | 20.4 | 19.5 |
| Cross direction | 26.9 | 23.8 | 24.9 | 23.0 |
| Tear strength of air dried sheet (about 5% moisture by weight): |  |  |  |  |
| Machine direction | 39.7 | 28.9 | 38.9 | 29.5 |
| Cross direction | 43.0 | 33.1 | 44.5 | 30.3 |
| M.I.T. Fold test: |  |  |  |  |
| Machine direction | 221 | 274 | 388 | 529 |
| Cross direction | 105 | 305 | 461 | 927 |

EXAMPLE VI

A pulp slurry containing about 3 percent pulp by weight was prepared by adding kraft process southern pine pulp and mechanically ground northern spruce pulp to a tank equipped with an agitator at a rate of 300 pounds of pulp (dry basis) per hour. About 50 percent of the total weight of pulp was kraft pulp. The slurry was pumped to a stock chest and thence to a mixing chest, where it was diluted to a consistency of about one percent pulp by weight and mixed with an aqueous slurry of calcium silicate.

The slurry of calcium silicate which was added to the beater was prepared by adding dry finely divided amorphous calcium silicate to water in a mixing vessel equipped with an agitator to form a slurry containing 0.5 pound of calcium silicate per gallon of water. The calcium silicate had an average ultimate particle size of about 0.3 micron, and contained approximately 18 percent by weight CaO, 66 percent $SiO_2$, 4 percent free water and 12 percent bound water by weight. This corresponds to a ratio of 3.3 moles of $SiO_2$ per mole of CaO.

The calcium silicate suspension was fed to the mixing chest at different rates, which were increased as the run progressed. At the outset the suspension was pumped to the mixing chest at the rate of 48 gallons per hour, and was thereafter raised to 90 gallons per hour, and then to 180 gallons per hour. These amounts corresponded to 24, 45, and 90 pounds of calcium silicate per hour, respectively, or 8, 15 and 30 percent by weight of calcium silicate based on the dry weight of fibers.

After mixing of the slurries of pulp and calcium silicate, the slurry containing both ingredients was pumped to a head box, from which it flowed on to the wire of a Fourdrinier machine 55 inches in width. Approximately 5 minutes on the average elapsed from the time the calcium silicate was mixed with the pulp slurry until paper was formed. The water drawn through the wire was continuously recirculated. Some pigment was washed out in the water drawn through the wire, so that the ratio of ash to wood fibers in the finished paper was slightly less than the ratio of pigment to pulp in the slurry coming on to the Fourdrinier machine.

The paper web moved at the rate of 300 feet per minute through press rolls and driers. Samples of the dried web were tested for brightness and opacity with a Hunter reflectometer. Opacity as reported is the ratio of brightness of a single sheet with a black backing to the brightness of the same sheet with a white backing. Results were as follows:

*Table VI*

| Sample | Percent Ash By Weight | Brightness | Opacity |
| --- | --- | --- | --- |
| 1 | 0 | 65.2 | |
| 2 | 0 | 65.6 | |
| 3 | 0 | 66.2 | |
| 4 | 0 | 62.2 | |
| 5 | 0 | 62.6 | |
| 6 | 7.4 | 69.6 | 76.9 |
| 7 | 9.9 | 70.6 | 77.4 |
| 8 | 10.2 | 71.0 | 76.9 |
| 9 | 14.0 | 72.0 | 80.6 |

Appreciable improvement in brightness was achieved with the brightness improving as the percentage of calcium silicate is increased.

Samples of paper filled with calcium silicate were found to receive printing ink satisfactorily, the characters printed on the sheet being sharp and black. Unfilled paper produced from the pulp described in this example was found to be unsatisfactory for printing, because the surface had numerous small spots which did not receive ink.

As the foregoing examples show, considerable improvements in the smoothness and gloss of paper containing kraft process southern pine pulp are effected by incorporation of an alkaline earth metal silicate according to the present invention. Most effective in this regard is a finely divided calcium silicate containing no organic matter such as starch and cellulose. The pigments of the present invention improve the brightness and opacity of papers prepared from a mixture of kraft and groundwood fibers, and reduce tensile and bursting strengths only slightly.

Some improvement in the smoothness, gloss, and brightness of paper sheets prepared in whole or in part from woods other than southern pine is effected by incorporation of an alkaline earth metal silicate in alkaline solution according to the present invention. Examples V and VI show the beneficial effect of loading a paper prepared from kraft process southern pine and northern spruce groundwood pulp, for example. Northern woods are of higher quality than southern pine for printing paper, and inclusion of an alkaline earth metal silicate filler in pulp of northern woods does not improve paper made therefrom as much as it improves paper made from southern pine. Furthermore, northern woods have a lower resin content than southern pine, so that processing in a basic medium is not necessary. In fact, it is frequently preferred to process northern woods in an acid medium rather than in a basic medium as is necessary in the practice of the present invention.

The above description has been directed primarily to embodiments of the invention wherein the calcium silicate is prepared by continuous mixing of flowing streams of sodium silicate and calcium chloride and the calcium silicate has the composition $CaO(SiO_2)_x$ where $x$ is about 2 to 4. Best results have been obtained using such calcium silicate. However, calcium silicate of somewhat lower surface area produced by a batch process in which the sodium silicate is added to a pool of calcium chloride solution or vice versa also may be used. Moreover, other water insoluble calcium silicates including mixed silicates of calcium and other metals may be used, particularly when the silicates have an average ultimate particle size below about one micron, preferably below 0.1 micron. Such silicates include calcium aluminum silicates, calcium sodium aluminum silicates, calcium potassium aluminum silicates, calcium zinc silicates, and like silicates in which the mole ratio of total $SiO_2$ to the total CaO in the product is not substantially greater than about 10. A typical mixed silicate of this type which recently has become available has the following composition:

| | Percent by weight |
| --- | --- |
| Ignition loss at 1000° C. | 16.7 |
| Loss in drying at 105° C. | 5.4 |
| $SiO_2$ | 41.1 |
| $R_2O_3$ (almost entirely $Al_2O_3$) | 10.88 |
| $Fe_2O_3$ | 0.24 |
| CaO | 11.82 |
| MgO | 0.38 |
| $Na_2O$ | 10.04 |
| Chloride | 0.04 |
| $SO_3$ | 3.8 |
| $CO_2$ | 6.6 |

Some portion of the CaO content of this product appears to be present as calcium carbonate.

Magnesium silicate, strontium silicate, or barium silicate may be used in place of calcium silicate in any of the foregoing examples.

Other woven, felted, or slurried fibrous materials, such as cotton, silk, rayon, linen, nylon, fibers of polymeric acrylonitrile and acrylonitrile copolymers, "Dacron," a polyester fiber, hemp, sisal, etc. may be treated in the same manner as cellulosic fibers.

This application is a continuation-in-part of my co-pending application, Serial Number 352,295, filed April 30, 1953, and now abandoned.

I claim:

1. A method of preparing paper which comprises forming an aqueous pulp slurry from fibers of highly resinous wood, finely divided precipitated alkaline earth metal silicate and an alkaline reacting acid salt having a hydrogen atom replaceable by a metal, said alkaline acid salt being less alkaline than the alkaline earth metal silicate and being reactive with the alkaline earth metal salt to form an insoluble alkaline earth metal salt, maintaining the slurry at an alkaline pH not exceeding 9.2, reacting alkaline earth metal silicate and the alkaline acid salt in the slurry and producing paper from the resulting slurry.

2. A method of preparing paper which comprises forming an aqueous pulp slurry from fibers of highly resinous wood, finely divided precipitated calcium silicate and an alkaline reacting acid salt having a hydrogen atom replaceable by a metal, said alkaline acid salt being less alkaline than the calcium silicate and being reactive with calcium silicate to form an insoluble calcium salt, maintaining the slurry at an alkaline pH not exceeding 9.2, reacting calcium silicate and the alkaline acid salt in the slurry and producing paper from the resulting slurry.

3. A method of preparing paper which comprises forming an aqueous pulp slurry from fibers of highly resinous wood finely divided precipitated calcium silicate containing 2 to 10 moles of $SiO_2$ per mole of CaO and an alkaline reacting acid salt having a hydrogen atom replaceable by a metal, said alkaline acid salt being less alkaline than the calcium silicate and being reactive with calcium silicate to form an insoluble calcium salt, maintaining the slurry at an alkaline pH not exceeding 9.2, reacting calcium silicate and the alkaline acid salt in the slurry and producing paper from the resulting slurry.

4. The method of claim 3 wherein a pulp slurry of a mixture of kraft process fibers and mechanically ground southern pine fibers is employed.

5. A method of preparing paper which comprises forming an aqueous pulp slurry from fibers of highly resinous wood, finely divided calcium silicate containing 2 to 10 moles of $SiO_2$ per mole of CaO and sodium bicarbonate, maintaining the slurry at a pH not exceeding 9.2, the concentration of calcium silicate ranging from 3 to 30 percent by weight based on the weight of dried pulp, reacting calcium silicate and sodium bicarbonate in the slurry and producing paper from the resulting slurry.

6. A method of preparing paper which comprises forming an aqueous pulp slurry from fibers of highly resinous wood, finely divided precipitated calcium silicate having an ultimate particles size less than 0.1 micron and containing 2 to 10 moles of $SiO_2$ per mole of CaO and an alkaline reacting acid salt having a hydrogen atom replaceable by a metal, said alkaline acid salt being less alkaline than the calcium silicate and being reactive with calcium silicate to form an insoluble calcium salt, the concentration of calcium silicate ranging from 3 to 30 percent by weight based on the weight of the dried pulp, maintaining the slurry at a pH not exceeding 9.2, reacting calcium silicate and alkaline acid salt in the slurry and producing paper from the resulting slurry.

7. The method of claim 6 wherein the calcium silicate contains 2 to 4 moles of $SiO_2$ per mole of CaO.

References Cited in the file of this patent

UNITED STATES PATENTS

| | | |
|---|---|---|
| 228,328 | Ehrhardt | June 1, 1880 |
| 1,345,317 | Clapp | June 29, 1920 |
| 1,443,454 | Booth | Jan. 30, 1923 |
| 2,237,374 | Smith | Apr. 8, 1941 |
| 2,315,892 | Booth | Apr. 6, 1943 |
| 2,554,934 | Ayers | May 29, 1951 |
| 2,599,094 | Craig | June 3, 1952 |